United States Patent [19]

Love et al.

[11] Patent Number: 4,599,788
[45] Date of Patent: Jul. 15, 1986

[54] SOLID ELECTROLYTIC CAPACITOR MANUFACTURE

[75] Inventors: Gordon R. Love; Richard J. Millard, both of Williamstown, Mass.

[73] Assignee: Sprague Electric Company, North Adams, Mass.

[21] Appl. No.: 630,916

[22] Filed: Jul. 13, 1984

[51] Int. Cl.[4] .......................... H01G 9/24; H01G 5/00
[52] U.S. Cl. .................................................. 29/570
[58] Field of Search ............................................ 29/570

[56] References Cited

U.S. PATENT DOCUMENTS

| | | | |
|---|---|---|---|
| 3,588,626 | 6/1971 | Cooper | 317/230 |
| 3,588,627 | 6/1971 | Markarian | 317/270 |
| 3,889,357 | 6/1975 | Millard et al. | 29/570 |
| 4,188,706 | 2/1980 | Millard et al. | 29/570 |
| 4,203,194 | 5/1980 | McGrath | 29/570 |

Primary Examiner—Howard S. Williams

[57] ABSTRACT

A solid electrolytic capacitor is manufactured by screen printing a layer of valve metal powder ink in an array of pads, placing a valve metal pellet on end on each pad, and sintering the resulting assembly to produce an array of porous sintered pellets bonded through a graded density layer to said substrate. Next the assembly is electrolytically anodized to form a valve metal oxide over its surfaces. An insulating polymer may be applied to the substrate around the pellets, and the pellets are impregnated and coated with manganese dioxide. A conductive layer and counterelectrode are applied over the manganese dioxide, and the anodic oxide is removed from the reverse side of the substrate. The array may be separated into individual capacitors.

10 Claims, 3 Drawing Figures

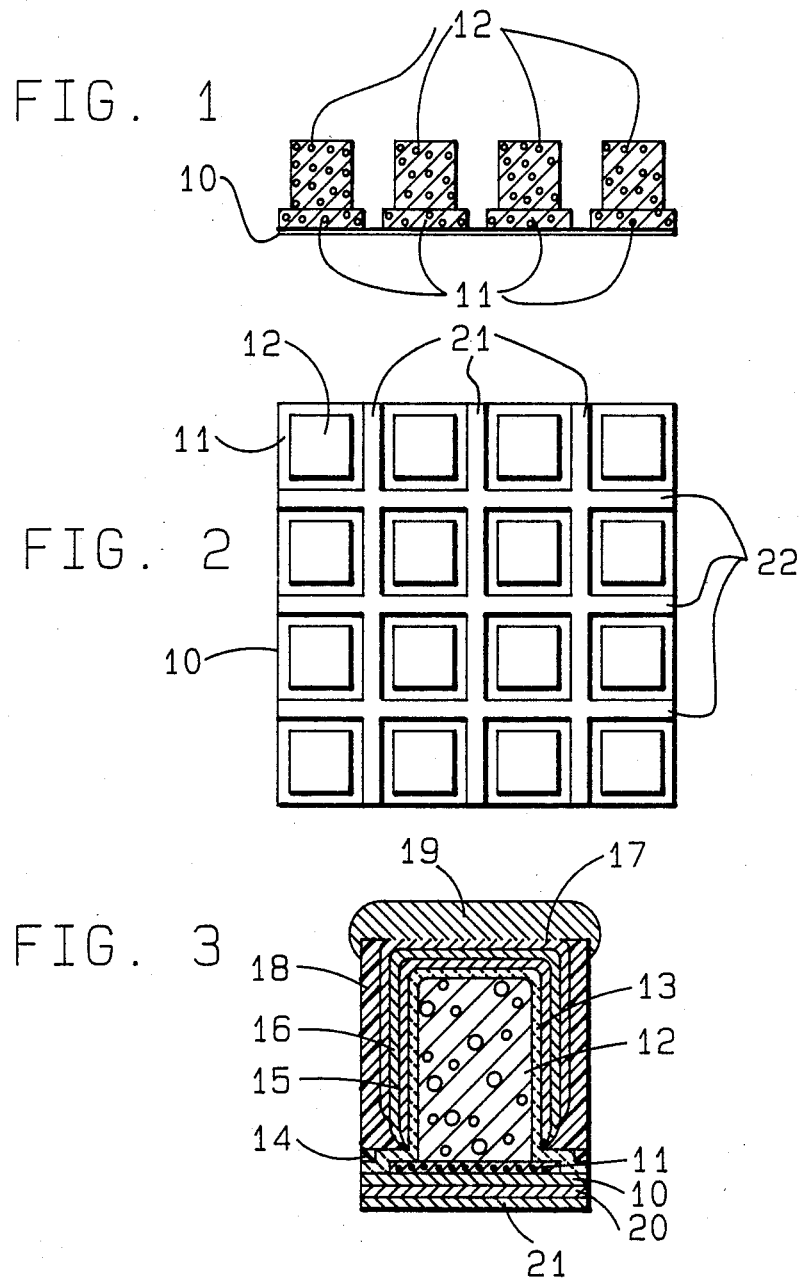

SOLID ELECTROLYTIC CAPACITOR MANUFACTURE

BACKGROUND OF THE INVENTION

This invention relates to a method of making a solid electrolytic capacitor in which a valve metal powder ink is screen printed on a valve metal substrate to form an array of pads, a valve metal pellet is placed on end on each pad, and the assembly is sintered producing a porour metal pellet array bonded through a graded density layer to the substrate. The assembly is then anodized to form a valve metal oxide over its surfaces and processed to form an array of solid electrolyte capacitors which may then be separated into individual capacitors.

Solid electrolytic capacitors have been made by screen printing multiple layers of tantalum onto a substrate, sintering, and processing into capacitors. Still others have been made by pressing and sintering powder pellets onto substrates and then processing to form solid electrolyte capacitors. However, pellets made from the high CV powders currently available have lower densities than those of the prior art and can not be adequately compressed onto a substrate to form any sort of a bond therebetween. While it is possible to screen print multiple layers of these high CV powders to form capacitors, the long dimension of the resulting body lies in the plane of the substrate which limits the numbers of anodes processed per batch.

SUMMARY OF THE INVENTION

It is a feature of this invention that valve metal pellets are affixed to a valve metal substrate through a layer of a valve metal ink screen printed onto that substrate. The ink initially serves as a binder or glue to attach the pellets, and the assembly is sintered to bond the pellets to the substrate via a graded density joint. The pellets are placed on end, allowing a greater density of pellets per square unit of substrate surface area. This means that more anodes can be processed into capacitors per batch than was possible heretofore.

The substrate bearing a plurality of anode pellets is then anodized forming a valve metal oxide over all surfaces. A thermally stable polymer may be applied to the anodized substrate in a grid between adjacent pellets. This polymer must be thermally stable to survive a subsequent pyrolysis step and preferably should not be wet by the solid electrolyte subsequently applied. The polymer may be a silicone varnish, a polytetrafluoroethylene or a polyimide. The polymer serves to insulate the substrate from the electrolyte subsequently applied so that a short circuit between the substrate and the electrolyte is prevented in the final step when the capacitors are cut apart. Alternatively, the polymer may be omitted, and the solid electrolyte subsequently applied is removed from the substrate by known means, e.g., laser cleaning.

Manganese dioxide is formed on the pellets in a known manner, e.g., by dipping the array into a manganous nitrate solution and pyrolyzing to form the dioxide. A conductive layer and a counterelectrode are applied over the manganese dioxide. An encapsulating layer, which bonds to the polymer covering the anodized substrate, preferably is applied. Before curing, the encapsulant overlying the upper face or top of the capacitor is removed. Another layer of counterelectrode is applied to this top face covering it and adjacent encapsulant. The reverse of the substrate is stripped down to bare metal which becomes the anode contact. Finally, the capacitor array is separated into individual or groups of capacitors.

BRIEF DESCRIPTION OF THE DRAWINGS

FIG. 1 shows a side view of the valve metal substrate having a screen printed valve metal pad deposited thereon with a valve metal pellet on top of the pad.

FIG. 2 shows a top view of the substrate with an array of pellets and pads thereon.

FIG. 3 shows a cross-section of the capacitor of this invention.

DESCRIPTION OF THE PREFERRED EMBODIMENTS

A valve-metal substrate 10 has screen printed valve metal pads 11 on which valve metal pellets 12 are placed as shown in FIGS. 1 and 2 in which the spacing between pellets and the pad and pellet dimensions are exaggerated for the sake of clarity. The valve metal pellet 12 is preferably made from a high surface-area powder which yields high CV capacitors.

The pellets 12 preferably have a green (unsintered) density of about 4 g/cc as opposed to the usual 5.5–6.5 g/cc. The screen printed ink has a density of about 5.5 g/cc, and when the array is sintered provides a graded density joint between the pellets and the substrate (density of about 16.6 g/cc for tantalum foil). Preferably, low-density pellets pressed with a binder/filler are used as the binder/filler imparts enough strength so that these can be used without sintering. The substrate 10 bearing the pads 11 and pellets 12 is heated, e.g., to about 150° C., to remove the binder and solidify the pads prior to sintering. Otherwise the pellets are partially sintered to increase their strength before placement on the pads.

As shown in FIG. 2, an array of pellets 12 is affixed to pads 11, which act as a glue holding pellets 12. The substrate 10, and the assembly is then sintered with pads 11 forming graded density joints between pellets 12 and substrate 10. The array is then anodized forming an oxide layer 13, e.g., tantalum pentoxide, over all the surfaces. A thermally stable polymer, preferably a polyimide, may be applied in a grid pattern in the spaces along rows 21 and columns 22 separating the pellet-pad structures one from another.

The array is processed in the usual manner to form solid electrolytic capacitors. One such capacitor is shown in FIG. 3. A solid manganese dioxide electrolyte 15 is deposited over the anodized surfaces 13 of the pellets and pads and coats their external surfaces by repeated dipping in manganese nitrate solution and pyrolyzing. A conductive layer 16 and counterelectrode 17 are applied.

When individual capacitors are the desired end, an encapsulant 18 is applied, preferably an epoxy coating applied by a fluidized bed technique. Before curing the encapsulant, the powdery encapsulant material is removed from the counterelectrode 17 at the end of the capacitor opposite the substrate by wiping or by sharply defined horizontal air streams as taught by N. C. McGrath in U.S. Pat. No. 4,203,194, issued May 20, 1980, and assigned to same assignee as the present invention. A second layer 19 of counterelectrode 17 is applied over the end and the upper portion of encapsulant 18 and serves as cathode termination.

Anodic oxide and any other material present is stripped off the reverse side of substrate 10, and the array is divided into individual or groups of capacitors with substrate 10 serving as anode contact. Preferably, the stripped substrate is plated with nickel or other metal and covered with solder entirely or in part, e.g., a metal pad or strip, which also may be solder covered, is applied as anode termination before the separation into individual capacitors.

In FIG. 3, a single capacitor prepared as above is shown. Pad 11 is graded density joint between substrate 10 and pellet 12. All of the surfaces of pellet 12, pad 11, and the adjacent surface of substrate 10 bears a layer of anodic oxide 13. Polymer 14 overlies the portion of anodic oxide 13 on substrate 10. Solid manganese dioxide electrolyte 15 is deposited over the anodic oxide 13 which covers pellet 12 electrolyte 15 does not adhere to polymer 14. Likewise conductive layer 16 adheres to electrolyte 15 but not to polymer 14. Counterelectrode 17, preferably silver, overlies a portion of conductive layer 16. An encapsulating layer 18 is applied over counterelectrode 17, adhering to polymer 14, and the layer 18 is removed from the end of the capacitor opposite substrate 10 by wiping it off or by an air jet. A second layer 19 of counterelectrode 17 is applied over this end and over the upper portion of encapsulant 18 as cathode termination.

The bottom surface of substrate 10 is cleaned of anodic oxide and coated with metal 20, preferably nickel. A solder layer 21 overlies metal 20 and serves as anode termination. The capacitors are then separated into individual units by cutting, preferably by laser cutting.

The invention is particularly suited for the manufacture of small capacitors, e.g., 1.6×3.2 mm, with approximately 5000 of this size processable per array. The bonding of the pellets to the substrate, preferably tantalum foil, provides an economical method of manufacturing small capacitors. The substrate also provides a more reliable anode termination for the low density pellets than is presently available. The process produces capacitors which have superior volumetric efficiency and improved high-frequency electrical properties.

What is claimed is:

1. A solid electrolytic capacitor manufacture comprising the steps of depositing an array of pads of a tantalum ink composition onto a tantalum substrate, placing a tantalum pellet on end on selected of said pads, sintering together the assembly of said substrate and said pads and said pellets, whereby said assembly contains a joint with a density intermediate the densities of said substrate and said pellets, providing said assembly with an oxide dielectric layer and a solid electrolyte layer and a counterelectrode layer, and separating said assembly along the lines of said array.

2. A method of claim 1 wherein said separating is by cutting.

3. A method of claim 2 wherein said cutting is laser cutting.

4. A method according to claim 1 wherein said solid electrolyte is manganese dioxide.

5. A method according to claim 1 wherein after applying said counterelectrode, each of said pellets in said array is encapsulated, said encapsulation is removed from a surface of said pellets, and another layer of counterelectrode is applied over said surface and a portion of said encapsulation.

6. A method of claim 1 wherein said oxide is removed from one face of the substrate opposite to the pellet array before said separating.

7. A method according to claim 6 wherein said one face, after anodic oxide removal, is coated with a metal.

8. A method according to claim 7 wherein said metal is nickel, and it is applied by plating.

9. A method according to claim 7 wherein said metal is covered with a solder.

10. A process according to claim 1 wherein an insulating layer of thermally stable polymer is applied over said anodic oxide on said substrate to cover spaces between said pellets isolating said substrate from said solid electrolyte subsequently applied.

* * * * *